United States Patent [19]

Larbig

[11] 4,230,567
[45] Oct. 28, 1980

[54] PROCESS FOR WORKING UP EFFLUENTS CONTAINING NITRO-HYDROXY-AROMATIC COMPOUNDS

[75] Inventor: Wolfgang Larbig, Krefeld, Fed. Rep. of Germany

[73] Assignee: Bayer Aktiengesellschaft, Leverkusen, Fed. Rep. of Germany

[21] Appl. No.: 28,029

[22] Filed: Apr. 6, 1979

[30] Foreign Application Priority Data

Apr. 27, 1978 [DE] Fed. Rep. of Germany ....... 2818680

[51] Int. Cl.$^2$ ............................................... C02C 5/00
[52] U.S. Cl. .................................... 210/600; 210/737
[58] Field of Search ................................. 210/56, 71

[56] References Cited
U.S. PATENT DOCUMENTS

| 3,350,259 | 10/1967 | Herrick et al. | 210/56 X |
| 3,762,989 | 10/1973 | Timpe | 210/71 X |
| 3,993,559 | 11/1976 | Oparsky et al. | 210/56 X |
| 4,013,757 | 3/1977 | Berkowitz | 210/71 X |
| 4,066,835 | 1/1978 | Hahn et al. | 210/71 X |

Primary Examiner—Thomas G. Wyse
Attorney, Agent, or Firm—Sprung, Felfe, Horn, Lynch & Kramer

[57] ABSTRACT

The invention concerns a process for working up an effluent containing nitro-hydroxy-aromatic compounds which comprises heating said effluent to 150° C. to 500° C. with the exclusion of air and oxygen and under elevated pressure. The process results in a decrease of nitro-hydroxy-aromatic compound concentration in the effluent to below 20 ppm. and the resulting material can then be fed to a microbiological sewage plant for further working up, without the microorganisms therein being killed by the bactericidally active nitro-hydroxy-aromatic compounds.

4 Claims, No Drawings

PROCESS FOR WORKING UP EFFLUENTS CONTAINING NITRO-HYDROXY-AROMATIC COMPOUNDS

The invention relates to a process for working up effluents containing nitro-hydroxy-aromatic compounds, such as are obtained, for example, during the nitration of aromatic compounds or during the preparation of nitro-hydroxy-aromatic compounds.

It is known that effluents containing organic compounds can be purified and worked up by extraction or by wet oxidation (wet combustion) (for the wet combustion of organic effluents, see E. Schmitt, Berichte der Abwassertechnischen Vereinigung e.V. (Reports of the Industrial Effluents Association e.V), volume 8, Verlag R. Oldenburg, Munich 1957). The extraction process is expensive in terms of apparatus and thus less economical. The decomposition of the nitro-hydroxy-aromatic compounds in the effluents is only partly achieved during wet oxidation. The concentration, in the effluents of the wet oxidation, of the bactericidally active nitro-hydroxy-aromatic compounds which remain is too high for subsequent biological working up.

A process has now been found for working up effluents containing nitro-hydroxy-aromatic compounds, which is characterised in that the effluents containing nitro-hydroxy-aromatic compounds are heated to temperatures in the range from 150° C. to 500° C. with exclusion of air and oxygen and under elevated pressure.

The process according to the invention makes it possible to decrease the content of nitro-hydroxy-aromatic compounds in the effluents, such as are obtained, for example, during the nitration of aromatic compounds and during the preparation of nitro-hydroxy-aromatic compounds, to values below 20 ppm. The effluents can thus be fed to a biological sewage plant for further working up, without the micro-organisms there being killed by the bactericidally active nitro-hydroxy-aromatic compounds.

It is advantageous for the process according to the invention if the effluents contain the nitro-hydroxy-aromatic componds in the form of their water-soluble salts.

The structure and composition of the nitro-hydroxy-aromatic compounds present in the effluents depend on the particular aromatic compounds employed for the nitration. General application of the process according to the invention for working up effluents containing nitro-hydroxy-aromatic compounds is not restricted by the structure and composition of the nitro-hydroxy-aromatic compounds in the effluents.

The following nitro-hydroxy-aromatic compounds, which can also be present in the form of their water-soluble salts, may be mentioned as examples: mono-, di- and tri-nitrophenol, mono-, di- and tri-nitrocresol, mono-, di- and tri-nitroresorcinol and mono-, di- and tri-nitroxylenol.

Possible salt-forming agents are all the metals which are capable of forming water-soluble salts with the nitro-hydroxy-aromatic compounds. Preferred metals which may be mentioned are the alkali metals, for example lithium, sodium, potassium and rubidium.

In order to ensure that the process according to the invention proceeds smoothly, the amount of nitro-hydroxy-aromatic compounds, or salts thereof, present in the effluents should be such that complete solution of the nitro-hydroxy-aromatic compounds, or salts thereof, in the effluents is still possible. The amount of nitro-hydroxy-aromatic compounds in the effluents can easily be determined analytically, for example by titration with potassium permanganate or by HPLC (High Pressure Liquid Chromatography).

The working up of the effluents containing nitro-hydroxy-aromatic compounds can be carried out in a pressure vessel and/or tube reactor at temperatures in the range from about 150° to about 500° C., preferably at 200° to 350° C., particular care being taken that air and oxygen are excluded. It can be appropriate to flush the apparatus with an inert gas beforehand.

It is also possible to heat the effluents under an inert gas atmosphere or under an initial pressure of inert gas of, for example, 0.1 to 100 bars. Examples of possible inert gases are nitrogen and/or argon.

When the effluents are heated, pressures in the range from about 50 to about 350 bars are establishedl, depending on the temperature and, if appropriate, the initial pressure of inert gas.

The nitro-hydroxy-aromatic compounds present in the effluents are decomposed on heating the effluents under pressure. The concentration of the nitro-hydroxy-aromatic compounds in the effluents can be reduced to values under 20 ppm, preferably under 10 ppm, by the process according to the invention.

About 5 to 120 minutes, in most cases 15 to 30 minutes, are required for decomposing the nitro-hydroxy-aromatic compounds, depending on the reaction conditions and the nitro-hydroxy-aromatic compounds present.

The process according to the invention can be carried out as follows: an aqueous waste liquor, from the washing process carried out after the nitration of benzene, which has a basic reaction and contains about 3,100 ppm of the sodium salt of mono-, di- and tri-nitrophenol, in addition to 0.25% by weight of free sodium hydroxide, 0.5% by weight of sodium sulphate, 1.8% by weight of sodium nitrate, 0.04% by weight of sodium nitrite and 0.05% by weight of sodium carbonate, is brought to a reaction temperature of 300° C., whilst stirring, in a pressure vessel and/or the reactor which has been flushed with nitrogen and is under an initial nitrogen pressure of 30 bars, a pressure of 120 bars being established. After a residence time of 15 minutes at this temperature—not including the heating and cooling time—the apparatus is cooled to room temperature, via a heat exchanger, and the liquor is removed.

Analysis after this treatment gave the following results: 3.5 ppm of the sodium salts of mono-, di- and tri-phenols, 0.1% by weight of free sodium hydroxide, 0.5% by weight of sodium sulphate, 0.5% by weight of sodium nitrite, 2.0% by weight of sodium nitrate and 0.14% by weight of sodium carbonate. The waste liquor was fed undiluted to a biological sewage plant and could be worked up there without any trouble.

The process according to the invention is distinguished by the following advantages, compared with other processes for working up effluents from, for example, nitration processes or the preparation of nitro-hydroxy-aromatic compounds: the process according to the invention is simpler in terms of apparatus, requires less energy and is thus considerably cheaper than the customary extraction processes. The effluents do not need to be freed from extraction agents and the extraction agents do not have to be worked up. No substances or concentrated extracts which are unacceptable from a safety point of view and which would subsequently have to be destroyed separately are thereby obtained.

Furthermore, the process according to the invention is cheaper than the process of direct combustion of effluents, which consumes a very large amount of energy.

In comparison to the wet oxidation, which does not achieve decomposition of the nitro-hydroxy-aromatic compounds to values below 20 ppm, the values obtained in the process according to the invention can, surprisingly, within the same or shorter reaction times, be brought far below 20 ppm, by which means biological after-treatment of the effluents is first possible at all.

The effluents pre-treated by the processes according to the invention can be fed directly, without dilution, to a biological sewage plant.

A further advantage of the process according to the invention is that deposition of dirt or cracked products on the walls of the heat exchanger or reactor is avoided.

The examples which follow serve to illustrate the process according to the invention:

EXAMPLE 1 (COMPARISON EXPERIMENT)

1,200 ml of an aqueous-alkaline waste liquor, from a benzene nitration process, containing 3,100 ppm of the sodium salts of mono-, di- and tri-nitrophenol, 0.25% by weight of sodium hydroxide, 0.5% by weight of sodium sulphate, 1.8% by weight of sodium nitrate, 0.04% by weight of sodium nitrite and 0.05% by weight of sodium carbonate are filled into a two liter autoclave with a stirrer and a means for measuring the pressure and the temperature. Air is then forced in up to a pressure of 15 bars. The autoclave is then heated to 300° C. and left at the reaction temperature for 15 minutes. A pressure of 90 bars results. After cooling, the waste liquor is removed from the autoclave. Analysis gives the following values: 580 ppm of the sodium salts of mono-, di- and tri-nitro-phenol, 0.17% by weight of sodium hydroxide, 0.5% by weight of sodium sulphate, 1.9% by weight of sodium nitrate, 0.05% by weight of sodium nitrite and 0.12% by weight of sodium carbonate.

It was found that this waste liquor cannot be worked up biologically.

EXAMPLE 2

The waste liquor employed in Example 1 was treated in a two liter autoclave analogously to Example 1, but the autoclave was flushed with nitrogen beforehand and, instead of air, nitrogen is forced in up to a pressure of 30 bars. The autoclave is then heated again to 300° C., whilst stirring, and kept at the reaction temperature for 15 minutes. During the procedure, the pressure increases to 114 bars. After cooling and removing the liquor, these were analysed. The following values were obtained: 2.6 ppm of the sodium salts of mono-, di- and tri-nitrophenol, 0.12% by weight of sodium hydroxide, 0.5% by weight of sodium sulphate, 2.1% by weight of sodium nitrate, 0.05% by weight of sodium nitrite and 0.2% by weight of sodium carbonate.

It was found that the waste liquor can readily be worked up biologically without trouble and without further dilution.

EXAMPLE 3

A waste liquor containing 4,300 ppm of the sodium salts of mono-, di- and tri-nitrophenol, 0.5% by weight of sodium hydroxide, 0.5% by weight of sodium sulphate, 1.7% by weight of sodium nitrate, 0.04% by weight of sodium nitrite and 0.05% by weight of sodium carbonate is treated in an autoclave exactly as described in Example 2. Subsequent analysis of the waste liquor gives the following results: 1.8 ppm of the sodim salts of mono-, di- and tri-nitrophenol, 0.30% by weight of sodium hydroxide, 0.5% by weight of sodium sulphate, 2.2% by weight of sodium nitrate, 0.08% by weight of sodium nitrite and 0.3% by weight of sodium carbonate.

The waste liquor can be used in the undiluted form for biological working up.

EXAMPLE 4

A waste liquor, from a toluene nitration process, containing 1,980 ppm of the sodium salts of mono-, di- and tri-nitrocresol, 0.4% by weight of sodium hydroxide, 0.4% by weight of sodium sulphate, 1.7% by weight of sodium nitrate, 0.03% by weight of sodium nitrite and 0.06% by weight of sodium carbonate is heated to 300° C., again as described in Example 2, under nitrogen and in an autoclave, a pressure of 109 bars being established. After a residence time of 15 minutes, the autoclave is cooled and the waste liquor removed from the autoclave is investigated analytically: 0.4 ppm of the sodium salts of mono-, di- and tri-nitrocresol, 0.35% by weight of sodium hydroxide, 0.4% by weight of sodium sulphate, 1.9% by weight of sodium nitrate, 0.03% by weight of sodium nitrite and 0.16% by weight of sodium carbonate.

This waste liquor can also be worked up in the undiluted form in a biological sewage plant.

EXAMPLE 5

A waste liquor, from a xylenol-nitration process, containing 2.600 ppm of the sodium salts of mono-, di- and tri-nitro xylenol and mono-, di- and tri-nitro-cresol, 0.45% by weight of sodium hydroxide, 0.5% by weight of sodium sulfate, 1.6% by weight of sodium nitrate, 0.03% by weight of sodium nitrite and 0.35% by weight of sodium carbonate is heated to 290° C., as described in Example 2, under nitrogene and in an autoclave, a pressure of 101 bars being established. After a resistance time of 15 minutes, the autoclave is cooled and the waste liquor removed from the autoclave is investigated analytically: 0.3 ppm of the sodium salts of mono-, di- and tri-nitro-xylenol and mono-, di- and tri-nitro-cresol, 0.3% by weight of sodium hydroxide, 0.5% by weight of sodium sulfate, 1.7% by weight of sodium nitrate, 0.03% by weight of sodium nitrite and 0.45% by weight of sodium carbonate. The waste liquor can be used in the undiluted form for biological working up.

EXAMPLE 6

A waste liquor, from a xylenol-nitration process, containing 3.100 ppm of the sodium salts of mono-, di- and tri-nitro-xylenol, mono-, di- and tri-nitro-cresol and mono-, di- and trinitro-resorcinol, 0.5% by weight of sodium hydroxide, 0.6% by weight of sodium sulfate, 1.9% by weight of sodium nitrate, 0.04% by weight of sodium nitrite and 0.3% by weight of sodium carbonate is heated to 310° C., as described in Example 2, under nitrogene and in an autoclave, a pressure of 116 bars being established. After a resistance time of 15 minutes, the autoclave is cooled and the waste liquor removed from the autoclave is investigated analytically: 0.8 ppm of the sodium salts of mono-, di- and tri-nitro-xylenol, mono-, di- and tri-nitro-cresol and mono-, di- and tri-nitro-resorcinol, 0.35% by weight of sodium hydroxide, 0.6% by weight of sodium sulfate, 2.1% by weight of sodium nitrate, 0.04% by weight of sodium nitrite and 0.45% by weight of sodium carbonate.

This waste liquor can be worked up in the undiluted form in anbiological sewage plant.

What is claimed is:

1. Process for treating an effluent containing a nitro- and hydroxy-group containing aromatic compounds which comprises heating said effluent containing said nitro- and hydroxy-group-containing aromatic compounds to a temperature in the range from 150° C. to 500° C. with exclusion of air and oxygen and under elevated temperature from 50 to 150 bars for 5 to 120 minutes.

2. Process according to claim 1, wherein the effluents contain the nitro- and hydroxy-group-containing aromatic compounds in the form of their water-soluble salts.

3. Process according to claim 1 or 2, wherein the effluents are heated under an inert gas atmosphere.

4. Process according to claim 3, wherein nitrogen and/or argon are used as the inert gases.

* * * * *